United States Patent [19]

Jaccarino

[11] Patent Number: 5,167,840
[45] Date of Patent: Dec. 1, 1992

[54] SYSTEMS AND METHODS FOR CLARIFYING LIQUIDS

[75] Inventor: Richard P. Jaccarino, Richmond, Va.

[73] Assignee: Infilco Degremont Inc., Richmond, Va.

[21] Appl. No.: 803,999

[22] Filed: Dec. 9, 1991

Related U.S. Application Data

[63] Continuation-in-part of Ser. No. 659,165, Feb. 22, 1991, abandoned.

[51] Int. Cl.$^5$ .............................................. B01D 37/00
[52] U.S. Cl. ..................................... 210/794; 210/807; 210/274; 210/275; 210/284
[58] Field of Search ............... 210/793, 794, 806, 807, 210/274–279, 284

[56] References Cited

U.S. PATENT DOCUMENTS

| | | | |
|---|---|---|---|
| 595,182 | 12/1897 | Lardner et al. | 210/279 |
| 1,432,351 | 10/1922 | McGahan | 210/284 |
| 3,623,978 | 11/1971 | Boze et al. | 210/792 |
| 3,680,701 | 8/1972 | Holca | 210/284 |
| 4,051,039 | 9/1977 | Heaney | 210/274 |
| 4,547,286 | 10/1985 | Hsiung | 210/284 |
| 4,793,934 | 12/1988 | Thompson et al. | 210/793 |

*Primary Examiner*—Ivars Cintins
*Attorney, Agent, or Firm*—Carroll F. Palmer

[57] ABSTRACT

Systems and methods for clarifying liquids, especially water, of the two stage upflow/downflow type that operate in a filtering mode, a first stage flush mode and a bistage backwash mode are improved by the use in the first, upflow stage of particulate filter media consisting of solid particles with a specific gravity of between 3.5 and 4.4 and a size between 1.5 and 4 mm. and, preferably, in the second, downflow stage particulate filter media consisting of solid particles having a specific gravity of between 1.5 and 4.0 and sizes of between 0.3 and 1.5 mm and providing for upward passage of gas bubbles through the first stage media particles without appreciable expansion thereof during at least part of each flush and backwash mode of operation.

10 Claims, 1 Drawing Sheet

SYSTEMS AND METHODS FOR CLARIFYING LIQUIDS

REFERENCE TO RELATED APPLICATION

This is a continuation-in-part of copending application Ser. No. 07/659,165, filed Feb. 22, 1991, now abandoned.

BACKGROUND OF THE INVENTION

1. Field of the Invention

This application relates to systems and methods for clarifying liquids, especially water. More particularly, it concerns such systems and methods wherein a liquid stream is passed first upwardly through a non-fluidized, non-buoyant filter media and then sequentially passing the partially clarified liquid downward through a second filter media.

2. Description of the Prior Art

Although conventional sand filters are relatively inexpensive and effective in removing solid impurities from liquids, their capacity for solids retention is limited. Thus, the actual size of the pore spaces between the sand grains must be small to prevent passage of objectionable solids into the effluent and this limits the capacity of sand filters for storing solids. Accordingly, conventional clarifying systems using such filters have included sedimentation devices to protect the sand filters from rapid clogging by removing the bulk of the solids from the liquid being treated before being passed to the sand filter (see U.S. Pat. No. 4,051,039).

Instead of sedimentation devices, two stage filter systems have been developed. One class of the two stage systems uses upflow contact filtration in the both the first stage and the second stage (see U.S. Pat. No. 3,623,978). A second class of the two stage systems uses upflow contact filtration in the first stage and downflow contact filtration in the second stage. (see U.S. Pat. Nos. 4,547,286 and 4,793,934).

Difficulties have been encountered in the two stage filter systems that have limited their utility, namely, difficulty in stabilizing the upflow filter to achieve the required water quality and in preventing breakthrough of collected solids. It is known, by definition, that unstabilized media is fluidized and that fluidization will result in so-called "breakthrough" resulting in undesired loss or removal of solids to the effluent. Hence, expensive components such as media screens, grids and buoyant media have been employed in attempts to stabilize the upflow operation. The present invention provides improvements in such second class of two stage filter systems without need to utilize such expensive components to stabilize the media.

OBJECTS

A principal object of the invention is the provision of improved systems and methods for clarifying liquids, especially water.

Another object is the provision of improved two stage filter systems of the upflow/downflow class that exhibit stabilized upflow and lack of breakthrough of collected solids in the first stage.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision, in a system for clarifying liquids, especially water, comprising a first chamber containing first particulate filter media consisting of solid particles with a specific gravity of between 3.5 and 4.4 and a size between 1.5 and 4 mm. and a second chamber containing second particulate filter media, the first chamber having an inlet to admit a liquid stream to pass upwardly through such first filter media and then sequentially pass downward through the second filter media. The system further comprises backwash means in both the first and second chambers to purge accumulated solids from the filter media contained therein. The backwash means in the first chamber includes air scour means to cause bubbles of air to pass upwardly between media particles in conjunction with upward flow of backwash water.

Advantageously, the second filter media chamber contains solid particles having densities of between 1.5 and 4.0 and a size of between 0.3 and 1.5 mm.

The objects are further accomplished by the provision of a new method for clarifying a liquid comprising as a first step passing influent liquid upwardly in a first zone through first particulate filter media consisting of solid particles with a specific gravity of between 3.5 and 4.4 and a size between 1.5 and 4 mm and then sequentially passing the effluent from the first zone downward in a second zone through second particulate filter media.

The new method comprises as a second step backwashing the particulate filter media in the first zone by passing backwash water upwardly through the first zone media and during at least part of the time of such upward backwash water passage, passing bubbles of air upwards between the first zone media particles. The second step further comprises passing backwash water upwardly through the media particles in the second zone.

In some embodiments, the first zone filter media is capped by a quantity of particulate filter media of specific gravity less than 3.5 and/or size less than 1.5 mm. In such embodiments, the lighter or smaller media does not become unstable as the bulk of removed solids are collected in the lower layer of first zone media.

The use of coarse, dense filter media in accordance with the invention has been discovered to remain stable even under high upflow rates, i.e., 10-15 gpm/sq. ft. and to be capable of being purged of collected solids by being fluidized by simultaneous flow of backwash liquid and air or equivalent gas upwardly therethrough during a flush mode or backwash mode.

Filter systems in accordance with the invention have several noteworthy advantages as compared with prior two stage filter systems. Thus, they are compact, with the application rate of the upflow clarification first stage exceeding prior clarification rates by a factor of four.

Also, these new systems produce effluents with exceptional clarity because the second stage polishing stage, while having very small pores, is not subject to rapid plugging because the upflow first stage removes all large particles.

Further, the new systems are reliable because they do not rely on screens, grids or like retaining devices which are subject to plugging.

Finally, the new systems are economical to construct and operate by reason of their compactness, simplicity and lack of expensive retainer components.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
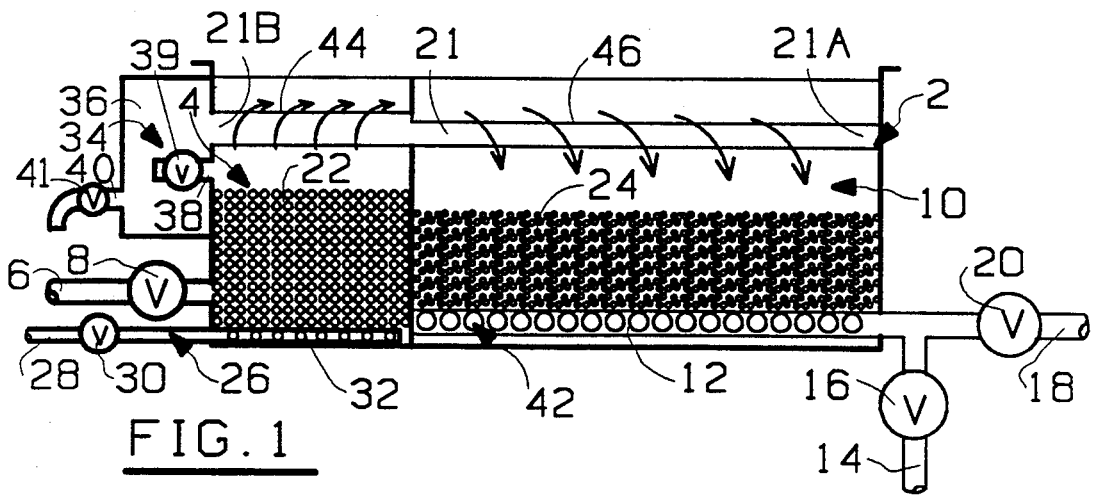
FIG. 1 is a lateral, sectional, diagrammatic view of a two stage filtration system in accordance with the invention operating in a filtering mode.

With reference in detail to the drawings, a filter system 2 of the invention for clarifying liquids comprises a first chamber 4 having an influent inlet 6 equipped with valve 8 and a second chamber 10 with underdrain 12 connected to filter effluent line 14 containing valve 16 and backwash inlet line 18 containing valve 20.

A longitudinal trough 21 extends midway through both chambers 4 and 10 which is closed at end 21A and open at end 21B.

The first chamber 4 contains first particulate filter media 22 consisting of solid particles with a specific gravity of between 3.5 and 4.4 and a size between 1.5 and 4 mm. Also, the second chamber 10 contains second particulate filter media 24 in the form of solid particles having a specific gravity of between 1.5 and 4.0 and a size of between 0.3 and 1.5 mm. Advantageously, media 24 comprises a plurality of layers of varying size media particles.

The system 2 has backwash means 26 in first chamber 4 to purge accumulated solids from the filter media 22 that comprises line 28, valve 30 and ported underlay 32. It also includes waste removal means 34 comprising tank 36, flush line 38 with its valve 39 and outlet line 40 with its valve 41. The backwash means 42 for chamber 10 comprises the underdrain 12, line 18 and valve 20.

In the filtration mode as shown in FIG. 1, valves 8 and 16 are open and valves 20, 30, 38 and 40 are closed. Influent from line 6 enters chamber 4, flows upward through packed filter media 22, typically at a rate of about 10 gals. per minute per square foot cross-section of the packed filter media 22. It then flows over the weir edge 44 into and along trough 21 to discharge over the wier edge 46, which is lower in height than edge 44, into chamber 10 and then downward through filter media 24 into underdrain 12 to exit via valve 16 and line 14. The water flow during the filtration mode is indicated by the arrows in FIG. 1.

Figure 2:
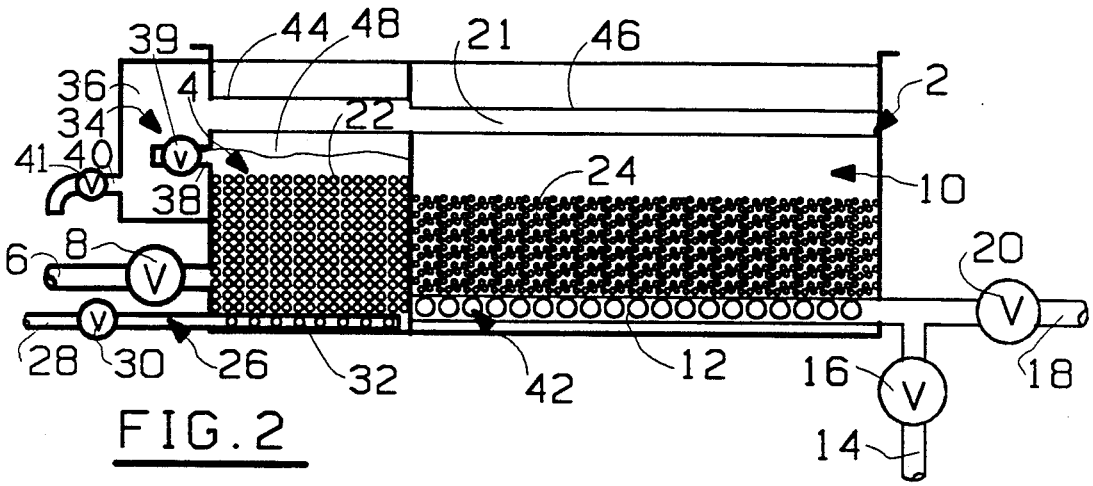
FIG. 2 is a lateral, sectional, diagrammatic view of the two stage filtration system of FIG. 1 operating in a first stage flush mode.

In the chamber 4 flush mode as shown in FIG. 2, valves 8, 30, 39 and 41 are open and valves 16 and 20 are closed. Influent via line 6 enters chamber 4, flows upward through filter media 22 and exits via line 38 and valve 39 plus line 40 and valve 41. The level of liquid in chamber 4 during the flush mode is indicated by wave line 48 in FIG. 2.

Also during the flush mode, compressed air enters the chamber 4 via line 28 and underlay 32 to cause air bubbles to flow through filter media 22 to thereby purge media 22 of accumulated solid material.

Figure 3:
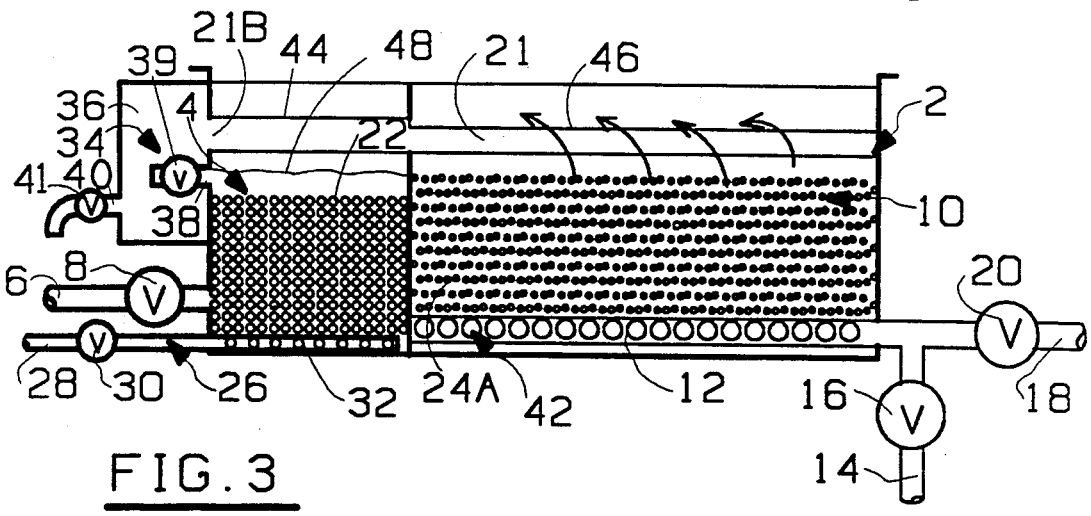
FIG. 3 is a lateral, sectional, diagrammatic view of a two stage filtration system of FIG. 1 operating in a two stage backwash mode.

In the backwash mode as shown in FIG. 3, valves 8, 20, 30, 39 and 41 are open and valve 16 is closed. The liquid and gas flow in chamber 4 duplicates the flow of the flush mode as explained above. Liquid flow in chamber 10 is from line 18 through underdrain 12 upward through filter media 24 and over the weir edge 46, as indicated by the arrows in FIG. 3, into and along trough 21 through end 21B into tank 36 ultimately to discharge through outlet line 40 and valve 41 to waste. During the backwash mode, the upward flow of liquid in chamber 10 serves to fluidize the filter media 24 to assist in purging of accumulated solid particles therefrom.

It has been discovered that gas (air) scour is essential to the success of the new systems and methods of the invention. Thus, it has been found that with the use of media particles of the specific gravity and size as herein specified in the first zone, it is not possible to backwash the first zone particles with any acceptable amount of backwash liquid flow, i.e., such liquid flow functions only to carry removed solids from the media, but does not move or clean the media.

It has been discovered that, with the use of media particles of the specific gravity and size as herein specified in the first zone, air or equivalent gas bubbles, e.g., nitrogen, impart some horizontal (side to side) forces on the media particles as the bubbles pass upward between them. This has been found to create "oscillation", which causes a displacement of solids and a scrubbing action between adjacent media particles without need to expand the media bed. It has also been discovered that liquids, at any reasonable flow rate, cannot do this. When liquids are used for backwash, it is necessary for suitable cleansing to rely on actually expanding the media bed, thereby creating a tumbling action, with the individual media particles constantly rising and falling back down within the expanded bed. This tumbling action and the abrasive action between the adjacent media grains effects the cleaning of the surfaces of the media grains. With the present invention, it was discovered that actual expansion of the media 22 cannot be accomplished at practical rates of water usage. However, it was learned that with a well distributed air scour in accordance with the invention, that expansion is not necessary for satisfactory cleansing of the first zone filter media bed. Because expansion of media 22 does not occur with rates of water flow used in accordance with this invention, it is possible to locate the flush line 38 in close proximity to the top of the unexpanded bed of media 22. This location is advantageous, as it allows for easy removal of heavy solids that might otherwise be difficult to carry to the waste trough 21.

In performing air scour of filter media 22, advantageous values are: air pressure between about 2-20 psi., particularly 6 psi., air volume between about 2-10 scfm/ft$^2$, particularly 4 scfm/ft$^2$, and duration between about 3-10 minutes, particularly 4 minutes.

Preferred distribution means for use in performing air scour is through evenly spaced nozzles (not shown) incorporating slots of sufficient size to prevent clogging, but small enough to exclude media particles. Header and lateral pipe means are also acceptable, but not preferred.

In a typical operation for the clarification of water in accordance with the invention, raw water, after screening, is dosed with treatment chemicals, e.g., by introduction of such chemicals into line 6 upstream of valve 8. If desired, optimum dispersion of treatment chemicals can be assured by the incorporation of an in-line motionless mixer (not shown) upstream of the valve 8.

Typical treatment chemicals include a primary coagulant that may be supplemented by a polymeric floc-strengthening agent. It is notable that, in many cases of operation in accordance with the invention, the use of a supplemental polymer is unnecessary on waters where it has been indispensable with systems of the prior art. This advantage is related to the specific characteristics of the new systems and methods, most noteably the particulate media used in the first chamber 4.

In some cases, an optional pH control chemical is also added. Where desirable, disinfectants or oxidants can also be added. Unlike water treatment systems which employ synthetic filter media, the operations in accordance with this invention suffer no adverse effects from exposure to strong oxidants such as ozone and pose no potential risks in terms of leaching organic degradation products. Advantageously, aluminum sulfate is used as the primary coagulant, but various iron salts, polyaluminum chloride and cationic polymers can be used.

Upon entry into the media 22, a flocculation process begins. As the small, tough floc formed prior to entering the media 22 encounters other floc, media surfaces and previously attached floc in the media 22, such new floc grows to sufficient size and is removed by typical mechanisms of particle transport and attachment, as well as interception and sieving.

The special filter media 22 of the invention operates at very high rates and is capable of removing the bulk of applied solids. Because many surface waters and surface-influenced ground waters have fairly low (less than 20 NTU) turbidities, the added coagulant often represents the most significant portion of the solids load on the media 22. Care must be taken then to accurately control the chemical additions.

Effluent from the first zone 4 flows to the second zone 10 which is advantageously a rapid rate multimedia unit that operates in a downflow mode. The influent to chamber 10 typically contains low levels of turbidity and is easily handled in chamber 10 to meet current governmental stringent standards. This application of multimedia filtration in chamber 10 in accordance with the invention is not analogous to direct or in-line filtration because the particulates in the first zone 4 effluent are already coagulated, small in size and discrete. Hence, they impart only small volumetric loading on media 24. Performance data has confirmed the ability of the new systems and methods of the invention to produce low turbidity water under a variety of operating conditions. It should be noted that the cycle times between cleanings of the multimedia chamber 10 are greatly extended in comparsion with related systems of the prior art which produce larger floc and are dependent on use of polyelectrolytes whose residues have the effect of decreasing the cycle times of multimedia filters. Since filtered water is required to clean the multimedia, the lenthened cleaning cycles of the present invention provide significant savings of time and expense of operation.

I claim:

1. In a system for clarifying liquids, including a first chamber containing first particulate filter media and a second chamber containing second particulate filter media, said first chamber having an inlet to admit a liquid influent stream to pass upwardly through said first filter media and then sequentially pass downward through said second filter media and backwash means in both said first and second chambers to purge accumulated solids from the filter media contained therein, the improvement which comprises:

having said first particulate filter media consist of solid particles with a specific gravity of between 3.5 and 4.4 and a size between 1.5 and 4 mm and gas scour means positioned in said first chamber below said first particulate filter media to cause gas bubbles to pass upward between said filter media particles contained in said first chamber during at least a portion of the operation of said backwash means in said first chamber without any substantial expansion of said first filter media.

2. The system of claim 1 further comprising second filter media as solid particles having a specific gravity of between 1.5 and 4.0 and sizes of between 0.3 and 1.5 mm.

3. In a method for clarifying a liquid wherein during a filtering mode step influent liquid is passed upwardly in a first zone through first particulate filter media contained therein and then sequentially is passed downward through a second zone through second particulate filter media contained therein and during a backwash mode step liquid is passed upward through said particulate filter media contained in both said first and second zones, the improvement which comprises:

having said first particulate filter media consist of solid particles with a specific gravity of between 3.5 and 4.4 and a size between 1.5 and 4 mm and causing gas bubbles to pass upward between said filter media particles contained in said first zone during at least a portion of said backwash mode step.

4. The method of claim 3 further comprising second filter media as solid particles having a specific gravity of between 1.5 and 4.0 and a size of between 0.3 and 1.5 mm.

5. The method of claim 3 wherein said liquid is water containing suspended particles.

6. The method of claim 3 wherein said gas bubbles are air bubbles formed from air under pressure of between about 2-20 psi. forced through nozzles at a volume between about 2-10 scfm/ft$^2$.

7. The method of claim 6 wherein the duration of said causing gas bubbles to pass is between about 3-10 minutes.

8. In a method for clarifying a liquid in a filter system wherein during a filtering mode step influent liquid is passed upwardly in a first zone through first particulate filter media contained therein and then sequentially is passed downward through a second zone through second particulate filter media contained therein and during a backwash mode step liquid is passed upward through said particulate filter media contained in both said first and second zones, the improvement which comprises:

a flush mode step in which influent liquid is passed upwardly through said first particulate filter media without appreciable expansion of said particulate filter media and then discharged from said filter system while no appreciable flow of liquid occurs in said second zone, having said first particulate filter media consist of solid particles with a specific gravity of between 3.5 and 4.4 and a size between 1.5 and 4 mm, and causing gas bubbles to pass upward between said filter media particles contained in said first zone without appreciable expansion of said particles during at least a portion of both said flush mode and said backwash mode steps.

9. The method of claim 8 wherein said liquid is water containing suspended particles.

10. The method of claim 8 wherein said gas bubbles are air bubbles formed from air under pressure of between about 2-20 psi. forced through nozzles at a volume between about 2-10 scfm/ft$^2$.

* * * * *